(12) United States Patent
Song et al.

(10) Patent No.: US 12,490,276 B2
(45) Date of Patent: Dec. 2, 2025

(54) METHOD AND APPARATUS FOR DETERMINING INFORMATION TRANSMISSION POSITION

(71) Applicant: DATANG MOBILE COMMUNICATIONS EQUIPMENT CO., LTD., Beijing (CN)

(72) Inventors: Lei Song, Beijing (CN); Xin Su, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 413 days.

(21) Appl. No.: 17/926,631

(22) PCT Filed: Feb. 25, 2021

(86) PCT No.: PCT/CN2021/077956
§ 371 (c)(1),
(2) Date: Nov. 21, 2022

(87) PCT Pub. No.: WO2021/232873
PCT Pub. Date: Nov. 25, 2021

(65) Prior Publication Data
US 2023/0209568 A1    Jun. 29, 2023

(30) Foreign Application Priority Data

May 22, 2020  (CN) .......................... 202010442881.8

(51) Int. Cl.
*H04W 4/00* (2018.01)
*H04L 5/00* (2006.01)
(Continued)

(52) U.S. Cl.
CPC ......... *H04W 72/232* (2023.01); *H04L 5/0053* (2013.01); *H04W 72/0446* (2013.01)

(58) Field of Classification Search
CPC ........... H04W 72/232; H04W 72/0446; H04W 72/23; H04L 5/0094; H04L 5/0053; H04L 5/0051
See application file for complete search history.

(56) References Cited

U.S. PATENT DOCUMENTS 10,201,006 B2 *   2/2019  Sun ..................... H04J 11/0036
10,841,940 B2 *  11/2020  Yeo ...................... H04L 1/1854
(Continued)

FOREIGN PATENT DOCUMENTS

CN          104202828 A       12/2014
CN          109392130 A        2/2019
(Continued)

*Primary Examiner* — Stephen M D Agosta
(74) *Attorney, Agent, or Firm* — KILPATRICK TOWNSEND & STOCKTON LLP

(57) ABSTRACT

A method and apparatus for determining an information transmission position. The method includes upon receiving at least one control information DCI sent by a network side, a terminal determines a reference transmission position according to a predefined rule, the preset rule being predefined information or configured by high-layer signaling, and then determines, according to the reference transmission position, a transmission parameter of a first physical channel or first physical information. In this way, a transmission parameter of a first physical channel or first physical information can be determined according to a determined reference transmission position, thus avoiding the problem of a reception failure of transmitted data information or first physical information due to incorrect determination of a transmission position of the first physical channel or first physical information by a terminal, and ensuring the reli- (Continued)

ability of reception of the transmitted data information by the terminal.

13 Claims, 5 Drawing Sheets

(51) Int. Cl.
 *H04W 72/0446* (2023.01)
 *H04W 72/232* (2023.01)

(56) References Cited

U.S. PATENT DOCUMENTS

| | | | | |
|---|---|---|---|---|
| 10,887,877 | B2* | 1/2021 | Zhang | H04W 72/04 |
| 10,952,231 | B2* | 3/2021 | Liou | H04W 72/23 |
| 10,973,013 | B2* | 4/2021 | Nogami | H04L 5/0044 |
| 11,032,777 | B2* | 6/2021 | Yeo | H04W 72/23 |
| 11,483,810 | B2* | 10/2022 | Zhang | H04W 74/006 |
| 12,082,202 | B1* | 9/2024 | Yeo | H04W 28/10 |
| 2016/0044694 | A1* | 2/2016 | Park | H04W 72/56 |
| | | | | 370/329 |
| 2016/0066345 | A1* | 3/2016 | Sun | H04J 11/004 |
| | | | | 370/329 |
| 2016/0150539 | A1* | 5/2016 | Xu | H04W 72/0446 |
| | | | | 370/329 |
| 2017/0150501 | A1* | 5/2017 | Park | H04W 72/0446 |
| 2017/0280476 | A1* | 9/2017 | Yerramalli | H04W 72/1268 |
| 2017/0290017 | A1 | 10/2017 | Takeda et al. | |
| 2017/0290046 | A1* | 10/2017 | Sun | H04W 72/0466 |
| 2018/0262993 | A1* | 9/2018 | Akkarakaran | H04W 52/325 |
| 2018/0323935 | A1* | 11/2018 | Yerramalli | H04W 72/23 |
| 2019/0075591 | A1* | 3/2019 | Sun | H04W 72/121 |
| 2019/0116582 | A1* | 4/2019 | Pelletier | H04W 72/51 |
| 2019/0288789 | A1* | 9/2019 | Li | H04W 28/24 |
| 2019/0306801 | A1* | 10/2019 | Zhou | H04W 52/04 |
| 2019/0327030 | A1* | 10/2019 | Yoshimoto | H04L 1/0061 |
| 2019/0335477 | A1* | 10/2019 | Nam | H04W 72/542 |
| 2019/0357262 | A1* | 11/2019 | Cirik | H04L 5/001 |
| 2019/0373588 | A1* | 12/2019 | Bae | H04L 5/0044 |
| 2019/0387506 | A1 | 12/2019 | Ugurlu et al. | |
| 2020/0015258 | A1 | 1/2020 | Zhou et al. | |
| 2020/0022078 | A1* | 1/2020 | Papasakellariou | H04L 5/0048 |
| 2020/0022139 | A1 | 1/2020 | Zhou et al. | |
| 2020/0100223 | A1 | 3/2020 | Park et al. | |
| 2020/0221429 | A1* | 7/2020 | Li | H04L 5/0053 |
| 2020/0288444 | A1* | 9/2020 | Cai | H04W 4/80 |
| 2020/0337038 | A1* | 10/2020 | Takeda | H04L 1/00 |
| 2020/0389847 | A1* | 12/2020 | Deng | H04W 52/0219 |
| 2020/0389922 | A1* | 12/2020 | Xu | H04W 74/0833 |
| 2021/0084621 | A1* | 3/2021 | Kim | H04L 5/0094 |
| 2021/0091988 | A1* | 3/2021 | Papasakellariou | H04W 74/006 |
| 2021/0352631 | A1* | 11/2021 | Fan | H04L 5/005 |
| 2021/0360667 | A1* | 11/2021 | Moon | H04L 5/0035 |
| 2021/0400652 | A1* | 12/2021 | Yoshioka | H04L 1/1854 |
| 2022/0174716 | A1* | 6/2022 | Takeda | H04W 74/0808 |
| 2022/0400443 | A1* | 12/2022 | Bar-Or Tillinger | H04L 5/0053 |
| 2023/0179377 | A1* | 6/2023 | Khoshnevisan | H04L 5/001 |
| | | | | 370/330 |
| 2023/0397204 | A1* | 12/2023 | Yuan | H04L 1/08 |
| 2025/0133568 | A1* | 4/2025 | Matsumura | H04L 1/08 |

FOREIGN PATENT DOCUMENTS

| | | |
|---|---|---|
| CN | 110167153 A | 8/2019 |
| CN | 110324898 A | 10/2019 |
| CN | 110536450 A | 12/2019 |
| CN | 110536451 A | 12/2019 |
| CN | 110831229 A | 2/2020 |
| WO | 2018144382 A2 | 8/2018 |
| WO | 2020006416 A1 | 1/2020 |

\* cited by examiner

METHOD AND APPARATUS FOR DETERMINING INFORMATION TRANSMISSION POSITION

CROSS REFERENCE TO RELATED APPLICATIONS

This application is a National Stage of International Application No. PCT/CN2021/077956, filed on Feb. 25, 2021, which claims priority of Chinese patent application No. 202010442881.8 filed to China National Intellectual Property Administration on May 22, 2020, the entire contents of which are incorporated herein by reference.

FIELD

The present application relates to the field of communications, in particular to a method and apparatus for determining a transmission information position.

BACKGROUND

In Rel-15 and Rel-16 specifications, the reception position of transmission parameters of a physical downlink shared channel (PDSCH) is determined by the reception position of the downlink control information (DCI) and the content of the DCI, and the DCI is transmitted only in one physical downlink control channel (PDCCH) within one scheduling device.

Typically, a terminal receives DCI transmitted in the PDCCH in a time slot, a transmission position of the DCI is thus determined, and obtains time domain resource assignment (TDRA) field information carried in the DCI is obtained, and a TDRA field includes mapping type information of a PDSCH configured for the terminal, time slot offset information of the PDSCH, indication information for a start symbol and a length symbol that determines the position of the PSDCH in a time slot, and the like configured for the terminal. Then, a transmission position at which data information in the PDSCH is received is determined based on the time slot offset information and the indication information for the start symbol and the length symbol.

However, when the DCI is repeatedly transmitted in two or more symbols or time slots, the terminal may receive a DCI transmitted in multiple different PDCCHs, in this way, positions at which data information transmitted in PDSCHs can be received are correspondingly determined based on multiple DCIs, which may result in a false determination of the positions of the PDSCHs by the terminal, i.e., an inconsistency in transmission resources of the PDSCHs determined by the terminal and transmission resources of the PDSCHs sent by a base station, to produce a problem of failing to correctly receive the data information transmitted in the PDSCHs.

For example, with reference to FIG. 1 and FIG. 2, FIG. 1 is an illustrative description in which a terminal receives a DCI only in one PDCCH within one scheduling device. The terminal receives a DCI transmitted in the PDCCH in a time slot n, determines that a time slot offset for a PDSCH is 1 according to the content of the DCI, and determines indication information for a start symbol and a length symbol of the PDSCH, and thus determines that a position at which the PDSCH can be received is an position of a time slot n+1 illustrated in FIG. 1.

Further, FIG. 2 exemplarily describes a scenario in which a DCI is transmitted in two or more symbols or time slots in a time division multiplexing based repetition manner. The terminal receives a DCI transmitted in a PDCCH1 and a DCI transmitted in a PDCCH2 in the time slot n and the time slot n+1, respectively, and the two DCIs both indicate that time slot offsets for PDSCHs is 1. According to the indication of the DCI and the transmission position of the PDCCH1, the terminal determines that data information transmitted in the PDSCH may be received at the position illustrated in the time slot n+1, whereas according to the indication of the DCI and the transmission position of the PDCCH2, the terminal determines that the data information transmitted in the PDSCH may be received in a time slot n+2. In this way, the terminal cannot determine the time slot in which the PDSCH is received according to time slot in which the DCI is received, and there may be the case that the base station configures the data information transmitted in the PDSCH in the time slot n+1, but the terminal determines to receive the data information transmitted in the PDSCH in the time slot n+2, and the terminal determines the position of the PDSCH by mistake, resulting in the failure of the reception of the data information transmitted in the PDSCH.

SUMMARY

Embodiments of the present application provide a method and apparatus for determining an information transmission position, to solve the problem in the prior art that a terminal cannot accurately determine an information transmission position, resulting in a failure of information transmission.

Some embodiments of the present application are as follows.

In one embodiment, a method for determining an information transmission position, including: obtaining, by a terminal, at least one downlink control information (DCI) sent by a network side, and the at least one DCI is at least one of at least two DCIs sent by the network side; determining, by the terminal, a reference transmission position according to a predefined rule, and the predefined rule is predefined information, or is indicated by higher layer signaling before the at least one DCI is received; and determining, by the terminal, a transmission parameter for a first physical channel or first physical information according to the reference transmission position.

In one embodiment, information contents of the at least two DCIs satisfy any one of: the information contents of the at least two DCIs, which are identical and respectively carried in PDCCHs configured for repetition transmission; or the information contents of the at least two DCIs, which are partly identical and respectively carried in the PDCCHs configured for repetition transmission.

In one embodiment, determining, by the terminal, the reference transmission position according to the predefined rule, includes: determining, by the terminal, the reference transmission position according to the predefined rule as any one of: a first time-frequency resource set; a first symbol set in a first time-frequency resource set; or a first control resource set.

In one embodiment, determining, by the terminal, the reference transmission position as the first time-frequency resource set, includes: determining, by the terminal, the first time-frequency resource set as any one of or a combination of: a first control channel carrying the at least one DCI; a monitoring occasion or a search space or a control resource set associated with the first control channel carrying the at least one DCI; a time-frequency resource set configured by the higher layer signaling; or a predefined time-frequency resource set.

In one embodiment, the first control channel includes any one of: at least one control channel that performs transmission earliest in time among control channels detected by the terminal; at least one control channel that performs transmission latest in time among the control channels detected by the terminal; at least one control channel that performs transmission earliest in time among control channels detected by the terminal within one scheduling period; or at least one control channel that performs transmission latest in time among control channels detected by the terminal within one scheduling period.

In one embodiment, determining, by the terminal, the first control channel as the at least one control channel that performs transmission earliest in time among the control channels detected or as the at least one control channel that performs transmission earliest in time among the control channels detected within one scheduling period, includes: determining, by the terminal, the at least one control channel that performs transmission earliest in time as any one of: at least one control channel a first symbol of which performs transmission earliest in time; or at least one control channel a last symbol of which performs transmission earliest in time.

In one embodiment, determining, by the terminal, the first control channel as the at least one control channel that performs transmission latest in time among the control channels detected or as the at least one control channel that performs transmission latest in time among the control channels detected within one scheduling period, includes: determining, by the terminal, the at least one control channel that performs transmission latest in time as any one of: at least one control channel a first symbol of which performs transmission latest in time; or at least one control channel a last symbol of which performs transmission latest in time.

In one embodiment, determining, by the terminal, the first time-frequency resource set as the time-frequency resource set configured by the higher layer signaling, includes: determining, by the terminal, the time-frequency resource set configured by the higher layer signaling as at least one of: at least one symbol configured by the higher layer signaling; a time-frequency resource set that is used by one control channel and is configured by the higher layer signaling; a search space that is associated with one control channel and is configured by the higher layer signaling; a monitoring occasion that is associated with one control channel and is configured by the higher layer signaling; or a control resource set that associated with one control channel and is configured by the higher layer signaling.

In one embodiment, determining, by the terminal, the first time-frequency resource set as the predefined time-frequency resource set, includes: determining, by the terminal, the predefined time-frequency resource set as any one of: a first symbol or a last symbol in a time slot in which the DCI is obtained by the terminal; a time slot in which the DCI is obtained by the terminal; or
a first symbol or a last symbol in which the DCI is obtained by the terminal.

In one embodiment, determining, by the terminal, the reference transmission position as the first symbol set in the first time-frequency resource set, includes: determining, by the terminal, the first symbol set in the first time-frequency resource set as any one of or a combination of: a first symbol of the first time-frequency resource set; a second symbol of the first time-frequency resource set; or a last symbol of the first time-frequency resource set.

In one embodiment, determining, by the terminal, the reference transmission position as the first control resource set, includes: determining, by the terminal, the first control resource set as any one of: a control resource set used by the first control channel carrying the at least one DCI; or a predefined control resource set.

In one embodiment, determining, by the terminal, the first control resource set as the predefined control resource set, includes: determining, by the terminal, a control resource set that has a smallest index among control resource sets associated with a search space which is to be monitored, as the predefined control resource set.

In one embodiment, the first physical channel includes any one of: a physical downlink shared channel; a physical uplink shared channel; a physical downlink shared channel with repetition transmission; or a physical uplink shared channel with repetition transmission.

In one embodiment, the first physical information includes a channel state information-reference signal (CSI-RS).

In one embodiment, the transmission parameter at least includes any one of or a combination of time domain resource assignment information, frequency domain resource assignment information, redundancy version information, or transmission configuration indication (TCI) information.

In another embodiment, a method for determining an information transmission position includes: generating, by a network side, a downlink control information (DCI); and sending, by the network side, at least two DCIs to a terminal, determining, when the terminal obtains at least one DCI of the at least two DCIs, a reference transmission position according to a predefined rule, and determining a transmission parameter for a first physical channel or first physical information according to the reference transmission position, and the predefined rule is pre-configured information, or is indicated by higher layer signaling before the at least one DCI is received.

In yet another embodiment, an apparatus for determining an information transmission position, at least includes a processor and a memory; and the processor is configured to read a program in a memory and to: obtain at least one downlink control information (DCI) sent by a network side, and the at least one DCI is at least one of at least two DCIs sent by the network side; determine a reference transmission position according to a predefined rule, and the predefined rule is predefined information, or is indicated by higher layer signaling before the at least one DCI is received; or determine a transmission parameter for a first physical channel or first physical information according to the reference transmission position.

In one embodiment, information contents of the at least two DCIs satisfy any one of: the information contents of the at least two DCIs, which are identical and respectively carried in PDCCHs configured for repetition transmission; or the information contents of the at least two DCIs, which are partly identical and respectively carried in the PDCCHs configured for repetition transmission.

In one embodiment, the processor is configured to determine the reference transmission position according to the predefined rule, which includes: determining, by the processor, the reference transmission position according to the predefined rule as any one of: a first time-frequency resource set; a first symbol set in a first time-frequency resource set; or a first control resource set.

In one embodiment, determining, by the processor, the reference transmission position as the first time-frequency resource set includes: determining, by the processor, the first time-frequency resource set as any one of or a combination of: a first control channel carrying the at least one DCI; a monitoring occasion or a search space or a control resource set associated with the first control channel carrying the at least one DCI; a time-frequency resource set configured by the higher layer signaling; or a predefined time-frequency resource set.

In one embodiment, the first control channel includes any one of: at least one control channel that performs transmission earliest in time among control channels detected; at least one control channel that performs transmission latest in time among the control channels detected; at least one control channel that performs transmission earliest in time among control channels detected within one scheduling period; or at least one control channel that performs transmission latest in time among control channels detected within one scheduling period.

In one embodiment, determining, by the processor, the first control channel as the at least one control channel that performs transmission earliest in time among the control channels detected or as the at least one control channel that performs transmission earliest in time among the control channels detected within one scheduling period, includes: determining, by the processor, the at least one control channel that performs transmission earliest in time as any one of: at least one control channel a first symbol of which performs transmission earliest in time; or at least one control channel a last symbol of which performs transmission earliest in time.

In one embodiment, determining, by the processor, the first control channel as the at least one control channel that performs transmission latest in time among the control channels detected or as the at least one control channel that performs transmission latest in time among the control channels detected within one scheduling period, includes: determining, by the processor, the at least one control channel that performs transmission latest in time as any one of: at least one control channel a first symbol of which performs transmission latest in time; or at least one control channel a last symbol of which performs transmission latest in time.

In one embodiment, determining, by the processor, the first time-frequency resource set as the time-frequency resource set configured by higher layer signaling, includes: determining, by the processor, the time-frequency resource set configured by the higher layer signaling as at least one of: at least one symbol configured by the higher layer signaling; a time-frequency resource set that is used by one control channel and is configured by the higher layer signaling; a search space that is associated with one control channel and is configured by the higher layer signaling; a monitoring occasion that is associated with one control channel and is configured by the higher layer signaling; or a control resource set that associated with one control channel and is configured by the higher layer signaling.

In one embodiment, determining, by the processor, the first time-frequency resource set as the predefined time-frequency resource set, includes: determining, by the processor, the predefined time-frequency resource set as any one of: a first symbol or a last symbol in a time slot in which the DCI is obtained by a terminal; a time slot in which the DCI is obtained by the terminal; or a first symbol or a last symbol in which the DCI is obtained by the terminal.

In one embodiment, determining, by the processor, the reference transmission position as the first symbol set in the first time-frequency resource set, includes: determining, by the processor, the first symbol set in the first time-frequency resource set as any one of or a combination of: a first symbol of the first time-frequency resource set; a second symbol of the first time-frequency resource set; or a last symbol of the first time-frequency resource set.

In one embodiment, determining, by the processor, the reference transmission position as the first control resource set, includes: determining, by the processor, the first control resource set as any one of: a control resource set used by the first control channel carrying the at least one DCI; or a predefined control resource set.

In one embodiment, determining, by the processor, the first control resource set as the predefined control resource set, includes: determining, by the processor, a control resource set that has a smallest index among control resource sets associated with a search space which is to be monitored, as the predefined control resource set.

In one embodiment, the first physical channel includes any one of: a physical downlink shared channel; a physical uplink shared channel; a physical downlink shared channel with repetition transmission; or a physical uplink shared channel with repetition transmission.

In one embodiment, the first physical information includes a channel state information-reference signal (CSI-RS).

In one embodiment, the transmission parameter at least includes any one of or a combination of time domain resource assignment information, frequency domain resource assignment information, redundancy version information, or transmission configuration indication (TCI) information.

In another embodiment, an apparatus for determining an information transmission position at least includes a processor and a memory; and the processor is configured to read a program in the memory and to: generate a DCI; and send at least two DCIs to a terminal, determine, when the terminal obtains at least one DCI of the at least two DCIs, a reference transmission position according to a predefined rule, and determine a transmission parameter for a first physical channel or first physical information according to the reference transmission position, and the predefined rule is pre-configured information, or is indicated by higher layer signaling before the at least one DCI is received.

In one embodiment, an apparatus for determining an information transmission position includes: an obtaining device, configured to obtain at least one downlink control information (DCI) sent by a network side, and the at least one DCI is at least one of at least two DCIs sent by the network side; a determining device, configured to determine a reference transmission position according to a predefined rule, and the predefined rule is predefined information, or is indicated by higher layer signaling before the at least one DCI is received; and a processing device, configured to determine a transmission parameter for a first physical channel or first physical information according to the reference transmission position.

In another embodiment, an apparatus for determining an information transmission position includes: a generating device, configured to generate a DCI; and a sending device, configured to send at least two DCIs to a terminal, determine, when the terminal obtains at least one DCI of the at least two DCIs, a reference transmission position according to a predefined rule, and determine a transmission parameter for a first physical channel or first physical information according to the reference transmission position, and the predefined rule is pre-configured information, or is indicated by higher layer signaling before the at least one DCI is received.

In yet another embodiment, a storage medium is provided, and when instructions stored in the storage medium are executed by a processor, the above any method for determining the information transmission position can be executed.

In one embodiment, a storage medium is provided, and when instructions stored in the storage medium are executed by a processor, the above any method for determining the information transmission position at the network side can be executed.

The present application has the following beneficial effects. In summary, the embodiments of the present application provide the method and apparatus for determining the information transmission position, the terminal obtains at least one DCI sent by the network side, the at least one DCI is at least one of the at least two DCIs sent by the network side, then, the terminal determines the reference transmission position according to the predefined rule that is predefined information or is indicated by the higher layer signaling before the at least one DCI is received, and the terminal determines the transmission parameter for the first physical channel or the first physical information according to the reference transmission position.

The transmission parameters for the first physical channel or the first physical information may be determined according to the determined reference transmission position, to avoid the problem that the terminal determines the transmission position of the first physical channel or the first physical information by mistake to result in a failure of reception of the transmitted data information or the first physical information, and guaranteeing the reliability of the reception of the transmitted data information by the terminal.

DETAILED DESCRIPTION OF THE EMBODIMENTS

To solve the problem in the prior art that a terminal cannot accurately determine an information transmission position, resulting in a failure of information transmission. In the present application, first, the terminal obtains at least one downlink control information, i.e., DCI, sent by the network side, the at least one DCI is one of at least two DCIs sent by the network side. Then, the terminal determines a reference transmission position according to a predefined rule that is predefined information or is indicated by higher layer signaling before the at least one DCI is received. The terminal determines a transmission parameter for a first physical channel or first physical information according to the reference transmission position.

Some embodiments of the present application will now be further described in detail with reference to the drawings.

After receiving the DCI sent by the network side, the terminal determines the reference transmission position according to the predefined rule, determines the transmission parameter for the first physical channel or the first physical information based on the reference transmission position, and further can accurately determine the information transmission position, and the reliable transmission of information between the terminal and the network side is guaranteed.

Figure 1:
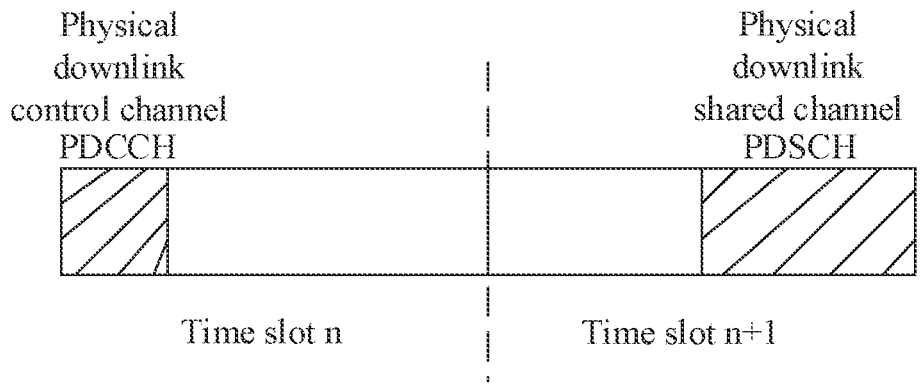
FIG. 1 is a schematic diagram of determination of a time slot for a PDSCH transmission according to the prior art.
Figure 2:
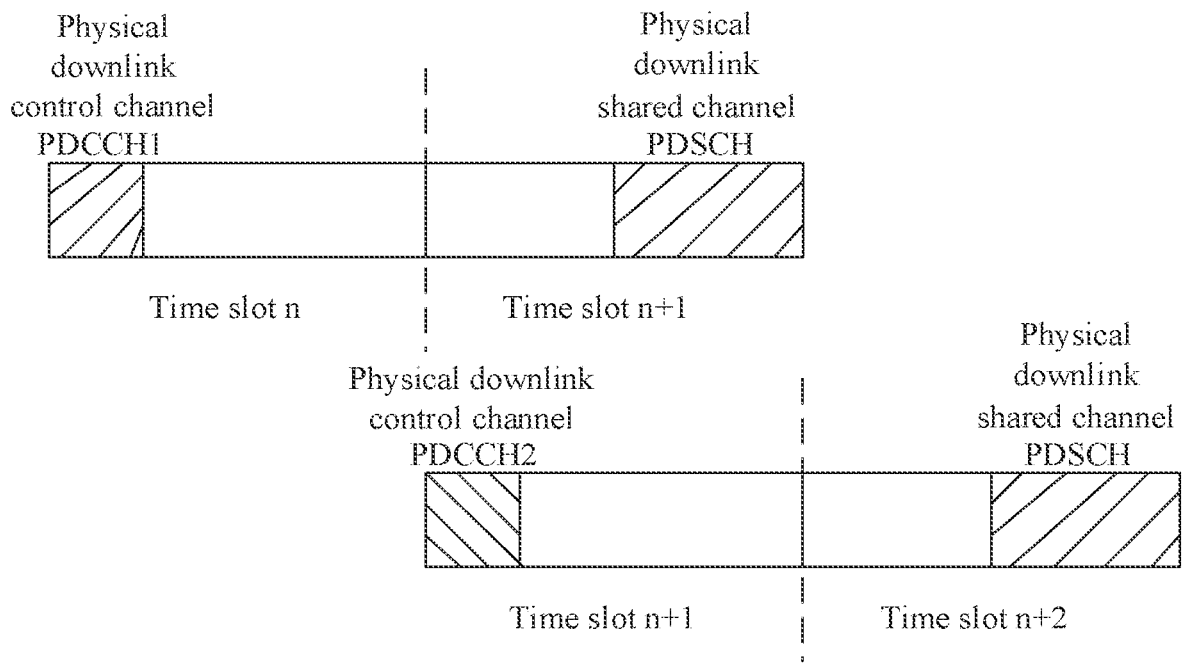
FIG. 2 is a schematic diagram of repetition transmissions of a PDCCH at a network side according to the prior art.
Figure 3:
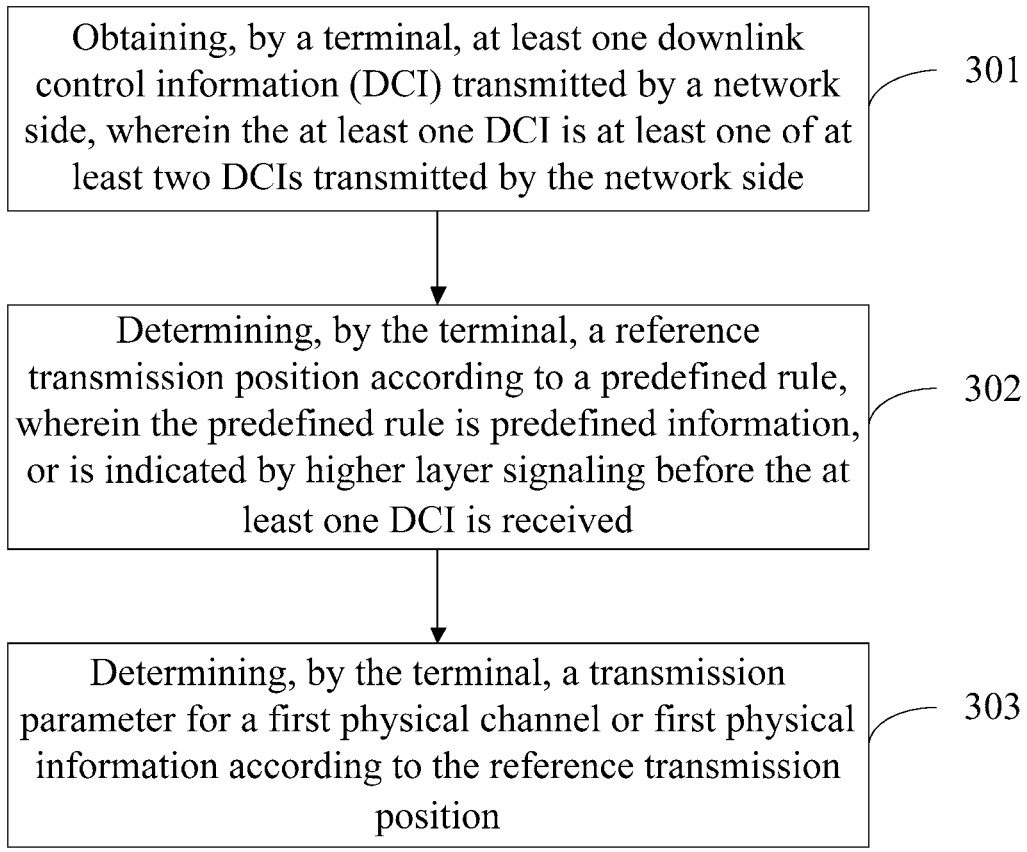
FIG. 3 is a flowchart of determining an information transmission position by a terminal according to an embodiment of the present application.

The process for determining an information transmission position by a terminal side according to the present application will now be described with reference to FIG. 3.

Step 301: a terminal obtains at least one downlink control information (DCI) sent by a network side, and the at least one DCI is at least one of at least two DCIs sent by the network side.

The terminal obtains at least one DCI sent by the network side, which specifically includes the following cases.

The terminal receives DCI that is carried in a PDCCH and sent by a network side device, and the PDCCH is configured for repetition transmission by the network side device. In one embodiment, the terminal receives at least two DCIs sent by the network side, information contents of the at least two DCIs may be identical, or may also be partly identical, and are respectively carried in the PDCCHs configured for repetition transmission, and the at least two DCIs are configured to schedule the same physical channel or the same physical information.

For example, at least two transmission points are used for repetition transmission of the PDCCH, there is one DCI in each repetition transmission, and the at least two DCIs may be two DCIs whose information contents are identical, or may be two DCIs whose information contents are not completely identical (e.g., information fields are different, or DCI formats may be different, etc.).

The repetition transmission manner of the PDCCH may be any one of or a combination of a time division multiplexing manner, a frequency division multiplexing manner, a space division multiplexing manner, an inter-control resource set multiplexing manner, or an intra-control resource set multiplexing manner.

By adopting the time division multiplexing manner, the network side may send at least two DCIs to the terminal in different time slots within the same frequency range or in different symbols with in the same time slot.

By adopting the frequency division multiplexing manner, the network side may send at least two DCIs to the terminal in different frequency ranges within the same time slot or the same symbol.

By adopting the space division multiplexing manner, the network side may send at least two DCIs to the terminal, by using different TCI states, on the same time-frequency resource.

By adopting the inter-control resource set multiplexing manner, the network side may send at least two DCIs to the terminal in different control resource sets.

By adopting the intra-control resource set multiplexing manner, the network side may send at least two DCIs to the terminal in the same control resource set.

By adopting the combination of any two of the above multiplexing manners, the network side may send at least two DCIs to the terminal.

It should be noted that the network side device may indicate, by higher layer signaling, the terminal for repetition transmission of the PDCCH, i.e., indicate the terminal receiving or detecting the at least two DCIs, before the network side device sends the at least two DCIs to the terminal.

Step 302: the terminal determines a reference transmission position according to a predefined rule, and the predefined rule is predefined information, or is indicated by higher layer signaling before the at least one DCI is obtained.

After receiving the DCI, the terminal determines the reference transmission position according to the predefined rule, and specifically, the configuration of the predefined rule is classified into the following cases.

In a first case, the predefined rule may be a rule predefined in a specification or information preconfigured on the terminal.

In a second case, the predefined rule may be information that is indicated by the higher layer signaling and is received in advance.

In a third case, the predefined rule may be information that is indicated by the higher layer signaling before the DCI is received.

In one embodiment, in the above step 302, the terminal determines the reference transmission position according to the predefined rule, and the terminal determines that the reference transmission position includes, but is not limited to, any one of the followings A, B or C.

A is a first time-frequency resource set.

It should be noted that the terminal determines the reference transmission position as the first time-frequency resource set, and specifically, the terminal determines that the reference transmission position includes, but is not limited to, any one of or a combination of the following A1, A2, A3 or A4.

A1 is a first control channel carrying the at least one DCI.

A2 is a monitoring occasion or a search space or a control resource set associated with the first control channel carrying the at least one DCI.

It should be noted that before performing information transmission on the first control channel carrying the at least one DCI received by the terminal, preset association cases involved include, but are not limited to, any one of the following cases.

In a first case, the first control channel is associated with a monitoring occasion.

In one embodiment, the terminal searches for control information transmitted by the network side at a pre-configured monitoring occasion, and when the terminal detects the first control channel carrying the at least one DCI, the terminal determines a monitoring occasion associated with the first control channel.

In a second case, the first control channel is associated with a search space.

In one embodiment, the terminal searches for control information transmitted by the network side in a pre-configured search space, and when the terminal detects the first control channel carrying the at least one DCI, the terminal determines a search space associated with the first control channel.

In a third case, the first control channel is associated with a control resource set.

In one embodiment, the terminal searches for control information transmitted by the network side in a pre-configured search space, and when the terminal detects the first control channel carrying the at least one DCI, the terminal determines a search space associated with the first control channel. Since the control resource set is associated with the search space, the control resource set associated with the first control channel can be determined, i.e., the control resource set carrying the first control channel can be determined.

The control resource set, in particular CORESET, is a set of physical resources configured for PDCCH transmission or DCI transmission.

In one embodiment, the first control channel includes, but is not limited to, any one of the following A21, A22, A23 or A24. A21 is at least one control channel that performs transmission earliest in time among control channels detected by the terminal.

The terminal determines the first control channel as the at least one control channel that performs transmission earliest in time among the control channels detected, and specifically, the terminal determines that the at least one control channel that performs transmission earliest in time includes, but is not limited to, any one of: A21.1 is at least one control channel a first symbol of which performs transmission earliest in time; or A21.2 is at least one control channel a last symbol of which performs transmission earliest in time.

A22 is at least one control channel that performs transmission latest in time among control channels detected by the terminal.

In one embodiment, the terminal determines that the at least one control channel that performs transmission latest in time includes, but is not limited to, any one of: A22.1 is at least one control channel a first symbol of which performs transmission latest in time; or A22.2 is at least one control channel a last symbol of which performs transmission latest in time.

A23 is at least one control channel that performs transmission earliest in time among control channels detected by the terminal within one scheduling period.

In one embodiment, the process that the terminal determines the at least one control channel that performs transmission earliest in time is the same as the process that the terminal determines the at least one control channel that performs transmission earliest in time in A21, which is not repeated here.

It should be noted that, scheduling periods are not distinguished when detection and determination on the first control channel are performed by the terminal in A21, but the detection and determination of the first control channel are by the terminal within one scheduling period in A23. The corresponding detection range in A23 is smaller, accuracy is higher, and a processing speed is higher, and the one scheduling period may specifically include one time slot, several symbols, multiple time slots, etc., which characterizes one data transmission process between the terminal and the network side.

A24 is at least one control channel that performs transmission latest in time among control channels detected by the terminal within one scheduling period.

In one embodiment, the process that the terminal determines the at least one control channel that performs transmission latest in time is the same as the process that the terminal determines the at least one control channel that performs transmission latest in time in A22, which is not repeated here.

It should be noted that, scheduling periods are not distinguished when detection and determination of the first control channel are performed by the terminal in A22, but the detection and determination of the first control channel are performed by the terminal within one scheduling period in A24. The corresponding detection range in A24 is smaller, accuracy is higher, and a processing speed is higher, and the one scheduling period may specifically include one time slot, several symbols, multiple time slots, etc., which characterizes one data transmission process between the terminal and the network side.

A3 is a time-frequency resource set configured by the higher layer signaling.

In one embodiment, the terminal determines the first time-frequency resource set as the time-frequency resource set configured by the higher layer signaling, and the terminal determines that the time-frequency resource set configured by the higher layer signaling includes, but is not limited to, at least one of A31, A32, A33, A34 or A35.

A31 is at least one symbol configured by the higher layer signaling.

A32 is a time-frequency resource set that is used by one control channel and is configured by the higher layer signaling.

A33 is a search space that is associated with one control channel and is configured by the higher layer signaling.

A34 is a monitoring occasion that is associated with one control channel and is configured by the higher layer signaling.

A35 is a control resource set that associated with one control channel and is configured by the higher layer signaling.

A4 is a predefined time-frequency resource set.

In one embodiment, the terminal determines the first time-frequency resource set as the predefined time-frequency resource set, and the terminal determines that the predefined time-frequency resource set includes, but is not limited to, any one of the following A41, A42 or A43.

A41 is a first symbol or a last symbol in a time slot in which the DCI is obtained by the terminal.

A42 is a time slot in which the DCI is obtained by the terminal.

A43 is a first symbol or a last symbol in which the DCI is obtained by the terminal.

It should be noted that, in the predefined time-frequency resource set, a time slot in which the DCI is obtained by the terminal may be any one of the time slots in which the DCI is obtained when the terminal sequentially obtains the DCI carried in the PDCCH within consecutive time slots, or may be a time slot in which the terminal detects the PDCCH carrying the DCI. For example, the terminal obtains the DCI within three consecutive time slots, a time slot in which the DCI is obtained by the terminal may be a first time slot, a second time slot, or a last time slot in which the DCI is obtained.

The first symbol or last symbol may be a first symbol or a last symbol in a time slot in which the PDCCH carries DCI, or may also be a first symbol or a last symbol of the PDCCH carrying the DCI.

B is a first symbol set in a first time-frequency resource set.

In one embodiment, the terminal determines the reference transmission position as the first symbol set in the first time-frequency resource set, and the terminal determines that the first symbol set in the first time-frequency resource set includes, but is not limited to, any one of or a combination of B1, B2 or B3.

B1 is a first symbol of the first time-frequency resource set.

B2 is a second symbol of the first time-frequency resource set.

B3 is a last symbol of the first time-frequency resource set.

C is a first control resource set.

In one embodiment, the terminal determines the reference transmission position as the first control resource set, and the terminal determines that the first control resource set includes, but is not limited to, any one of the following C1 or C2.

C1 is a control resource set used by the first control channel carrying the at least one DCI.

C2 is a predefined control resource set.

It should be noted that, the terminal determines the first control resource set as the predefined control resource set, and the terminal determines a control resource set that has a smallest index among control resource sets associated with a search space which is to be monitored, as the predefined control resource set.

Step 303: the terminal determines a transmission parameter for a first physical channel or first physical information according to the reference transmission position.

After determining the reference transmission position, the terminal determines the transmission parameter for the first physical channel or the first physical information, and the first physical information includes a channel state information reference signal (CSI-RS), the transmission parameter at least includes any one of or a combination of time domain resource assignment (TDRA) field information, frequency domain resource assignment (FDRA) information, redundancy version information, or transmission configuration indication (TCI) information.

It should be noted that, in one case, the terminal determines the transmission parameter for the first physical channel or the first physical information directly based on the reference transmission position, for example, the terminal may directly determine the reference transmission position as a control resource set scheduling the first physical channel or the first physical information, and as another example, the reference transmission position is used as a position at which data information or the first physical information transmitted in the first physical channel is obtained. In another case, the terminal may determine the transmission parameter for the first physical channel or the first physical information based on the reference transmission position and the content information in the DCI, for example, the terminal determines the time domain resource assignment information based on the reference transmission position and the content of a TDRA field, and the terminal determines the frequency domain resource assignment information, the redundancy version information, and the TCI information based on the contents of other information fields carried by the DCI.

The first physical channel includes, but is not limited to, any one of: a: a physical downlink shared channel; b: a physical uplink shared channel; c: a physical downlink shared channel with repetition transmission; or d: a physical uplink shared channel with repetition transmission.

Figure 4:
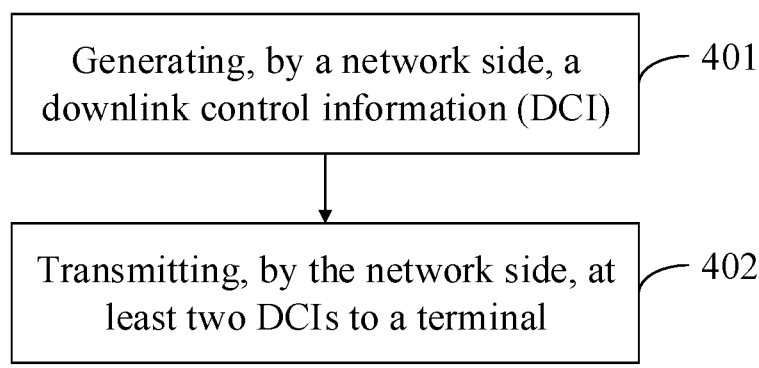
FIG. 4 is a flowchart of determining an information transmission position at a network side according to an embodiment of the present application.

The process for determining an information transmission position by a network side according to the present application will now be described with reference to FIG. 4.

Step 401: a network side generates a DCI.

Step 402: the network side transmits at least two DCIs to a terminal.

After the network side transmits at least two DCIs to the terminal, further, when the terminal obtains at least one DCI of the at least two DCIs, the determination of a reference transmission position according to a predefined rule is triggered, and a transmission parameter for a first physical channel or first physical information is determined, and the predefined rule is pre-configured information, or is indicated by higher layer signaling before the at least one DCI is received. The specific process of the determination of the reference transmission position has been described in detail in the above process in FIG. 3, which is not repeated here.

A method for determining an information transmission position, which is involved in the present application, is further described in detail below with reference to the following scenarios.

The terminal receives K DCIs transmitted by the network side within one scheduling period, and a manner in which the K DCIs are transmitted by the network side may be either a time division multiplexing manner or a frequency division multiplexing manner. The one scheduling period may be a time slot or multiple time slots, K repetition transmissions may be performed in K control resource sets in a first time slot or multiple time slots. The K DCIs correspond to K PDCCHs carrying the DCI, and the DCI payloads and information contents of the DCI carried in the K PDCCHs are identical, that is, indications of a TDRA field, an RV indication field, a TCI state information field or the like of the K DCIs may be identical, or may not identical completely, and, for the obtained DCI that is not completely identical, the terminal may determine the transmission parameter for the first physical channel or the first physical information based on the defined contents corresponding to the DCI. The following embodiments are described only by way of examples of DCIs having the identical contents.

In the embodiments of the present application, the transmission parameter for the first physical channel or the first physical information is determined according to the reference transmission position; and in another embodiment, the transmission parameter for the first physical channel or the first physical information is determined according to the reference transmission position and the information contents of the DCI. The first physical channel includes, but is not limited to, any one of: a physical downlink shared channel; a physical uplink shared channel; a physical shared channel with repetition transmission; or a physical uplink shared channel with repetition transmission. The first physical information includes, but is not limited to, CSI-RS. In the following embodiments, the determination of the transmission parameter for the physical downlink shared channel is taken as an example for description, and the transmission parameter includes, but is not limited to resource assignment information, redundancy version information, and TCI state indication.

Scenario 1

After obtaining at least one DCI transmitted by the network side in a time division multiplexing manner, the terminal determines the reference transmission position as a time-frequency resource set, and the time-frequency resource set may be any one of: a monitoring occasion or a search space or a control resource set associated with a first control channel carrying the at least one DCI; a time-frequency resource set configured by the higher layer signaling; or a predefined time-frequency resource set. As an example of taking a monitoring occasion associated with a control channel as a reference transmission position, it can be predefined that an offset S in the information content of the DCI received by the terminal characterizes an offset of the transmission position of the PDSCH with respect to the reference transmission position in a starting symbol S0, and it is predefined that a time slot offset K0 in the information content of the DCI received by the terminal is the time slot offset of the time slot in which there is the transmission position of the PDSCH with respect to the time slot in which there is the reference transmission position, and the transmission position of the PDSCH represents the time-domain resource assignment information of the PDSCH.

Figure 5:
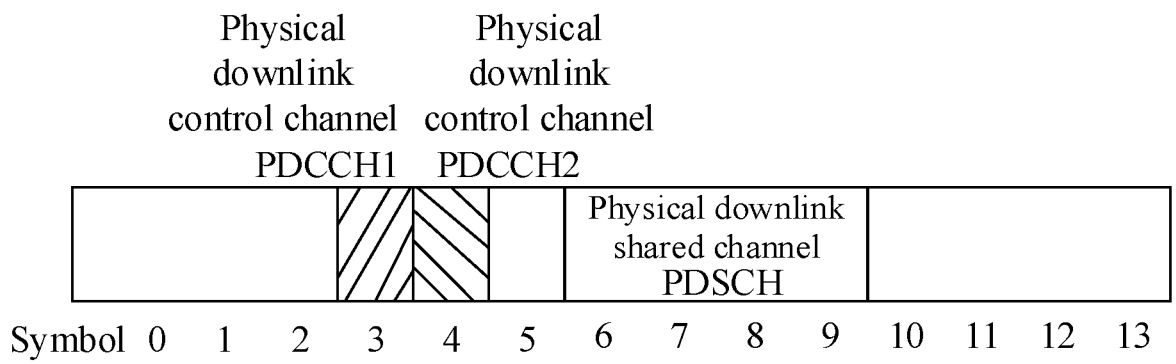
FIG. 5 is a schematic diagram of determining assignment information of a time-frequency resource of a PDSCH according to an embodiment of the present application.

For example, with reference to FIG. 5, the reference transmission position is a predefined monitoring occasion associated with a control channel, for example, at least one PDCCH that performs transmission earliest in time, i.e., a position at which the terminal detects a PDCCH1 shown in FIG. 5, and a starting position of the PDCCH1 is symbol 3, i.e., sym3. In one embodiment, according to the information content of the DCI carried in the PDCCH1, it can be learned that an indication S=3 in the TDRA field, and it is possible to determine the transmission position of the PDSCH to be symbol 6, i.e., sym6. Accordingly, both the network side and the terminal may determine that the transmission position of the PDSCH starts at symbol 6.

Figure 6:
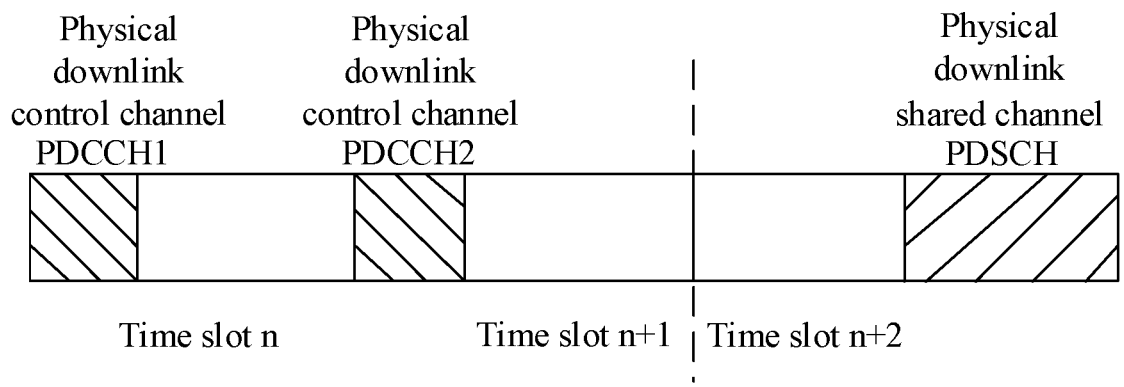
FIG. 6 is a schematic diagram of determining assignment information of a time-frequency resource of a PDSCH according to an embodiment of the present application.

As another example, with reference to FIG. 6, the terminal determines the reference transmission position as a monitoring occasion that is associated with a control channel and configured by the higher layer signaling, that is the transmission position in which the terminal detects the PDCCH2, i.e., a time slot n+1, as the reference transmission position shown in FIG. 6, and the terminal determines the time slot offset K0 in the TDRA field to be 1 based on the content of the received DCI, and thus, both the network side and the terminal may determine the time slot in which there is the transmission position for the PDSCH to be the time slot n+2.

Scenario 2

After the terminal obtains the information content of the DCI carried in the PDCCH based on determining the TCI state of the PDSCH, and after the reference transmission position is determined, the terminal calculates a scheduling offset with the PDSCH based on the reference transmission position, and a default TCI state (e.g., TCI 1) is set as the TCI state of the PDSCH when the offset is determined to be less than a predefined threshold value. Otherwise, a TCI state (e.g., TCI 2) indicated by a TCI state field in the obtained DCI is used as the TCI state for the PDSCH if the offset is determined to be greater than or equal to the predefined threshold value.

For example, with continued reference to FIG. 6, with a last symbol for the PDCCH1 as a reference transmission position, before no control information is detected, it may be assumed that PDSCH may be transmitted in a time slot n and later time slots. It is assumed that the terminal receives the data information transmitted in the PDSCH in the time slot n, an offset is calculated based on the last symbol of the PDCCH1 and the position of the assumed PDSCH. The offset is compared with the predefined threshold value, it is assumed that the predefined threshold value is 28 symbols, the offset of the position of the assumed PDSCH in the time slot n from the PDCCH1 is less than 28 symbols, and the terminal receives the PDSCH using TCI 1 in the time slot n.

It is assumed that the terminal receives the data information transmitted in the PDSCH in the time slot n+2, at the moment it is assumed that the offset of the PDSCH from the last symbol of the PDCCH1 is greater than the predefined threshold value, the terminal receives the PDSCH using TCI 2.

Similarly, for determining a TCI state of an aperiodic CSI-RS, the TCI state of the PDSCH is also determined according to the offset of the CSI-RS from a reference reception position, which is not repeated here.

Scenario 3

After repeatedly obtaining the information content of the DCI carried in the PDCCH, the terminal determines that no TCI state field is included in the DCI when the information content satisfies the following conditions: higher layer parameter tci-PresentInDCI is not configured; radio resource control parameter tci-PresentInDCI-Format1_2 is not configured; downlink control information format DCI format of 1_0 is configured. The reference transmission position is defined as a control resource set used by a first control channel carrying at least one DCI, or the reference transmission position is defined as a predefined control resource set, and it is predefined that the TCI state of the PDSCH is the same as the TCI state of the control resource set corresponding to the reference transmission position.

Figure 7:
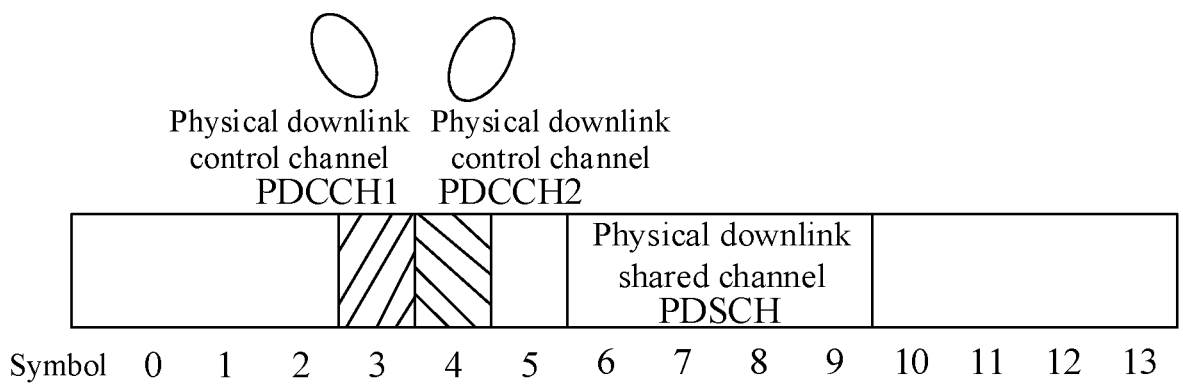
FIG. 7 is a schematic diagram illustrating determination of TCI for a PDSCH according to an embodiment of the present application.

For example, refer to FIG. 7, after obtaining the DCI carried in the PDCCH1 and the PDCCH2, the terminal determines that no TCI state field is included in the information content of the DCI, and the control resource sets used for transmission of the PDCCH1 and the PDCCH2 are different, and after the reference transmission position is determined as the control resource set used for transmission of the PDCCH1, the TCI state of the PDSCH may be determined as the TCI state of the control resource set used for transmission of the PDCCH1.

Scenario 4

A predefined time-frequency resource set is set as a reference transmission position, and the time-frequency resource set includes, but is not limited to, any one of: a first symbol or a last symbol in a time slot in which the DCI is obtained by the terminal; a time slot in which the DCI is obtained by the terminal; or a first symbol or a last symbol in which the DCI is obtained by the terminal. Further, the assignment information of the time-frequency resource of the PDSCH is determined based on the determined reference transmission position and a TDRA field indication carried in the DCI, and since the information contents of the DCI repetitively obtained are identical, the determined assignment information of the time-frequency resource of the PDSCH is unique.

For example, a first symbol 0 in the time slot when the terminal obtains the PDCCH1 is set as the reference transmission position, an offset S in the TDRA field is determined to be 6 based on the information content of the DCI carried in the PDCCH1, and it is determined that the transmission position of the PDSCH may start at a symbol 6 in the time slot. In this case, even if a higher layer parameter ReferenceofSLIV-ForDCIFormat1_2 is configured, the transmission position of the PDSCH is still determined according to the reference transmission position.

Scenario 5

After obtaining the information content of the DCI carried in the PDCCH, the terminal determines redundancy versions of the respective transmission occasions for the PDSCH for repetition transmission are determined, and after determining the reference transmission position, the terminal further determines an index of a time slot occupied by the PDSCH for repetition transmission, and corresponding transmission occasions corresponding to respective repetition transmissions. Further, the redundancy version used by the PDSCH in each time slot can be determined according to the redundancy versions indicated in the DCI.

Figure 8:
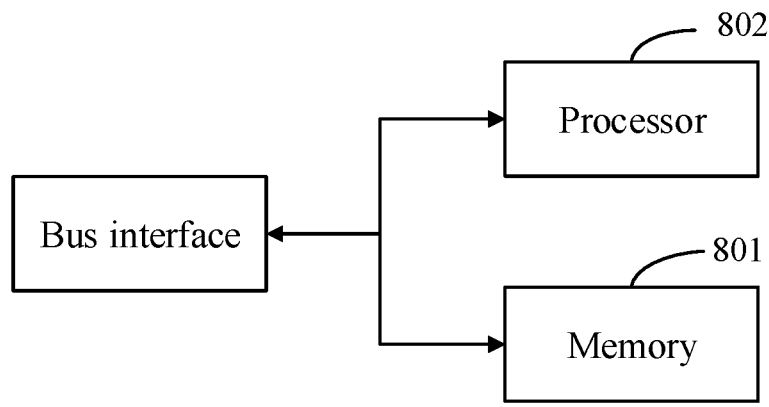
FIG. 8 is a schematic diagram of an entity structure of a terminal according to an embodiment of the present application.

In some embodiments, refer to FIG. 8, an embodiment of the present application provides an apparatus for determining an information transmission position, at least including a processor 802 and a memory 801, and the processor 802 is configured to read a program in the memory 801 and to: obtain at least one downlink control information (DCI) transmitted by a network side, and the at least one DCI is at least one of at least two DCIs transmitted by the network side; determine a reference transmission position according to a predefined rule, and the predefined rule is predefined information, or is indicated by higher layer signaling before the at least one DCI is received; and determine a transmission parameter for a first physical channel or first physical information according to the reference transmission position.

In one embodiment, information contents of the at least two DCIs satisfy any one of: the information contents of the at least two DCIs, which are identical and respectively carried in PDCCHs configured for repetition transmission; or the information contents of the at least two DCIs, which are partly identical and respectively carried in the PDCCHs configured for repetition transmission.

In one embodiment, the processor 802 is configured to determine the reference transmission position according to the predefined rule, which includes: determining, by the processor 802, the reference transmission position according to the predefined rule as any one of: a first time-frequency resource set; a first symbol set in a first time-frequency resource set; or a first control resource set.

In one embodiment, determining, by the processor 802, the reference transmission position as the first time-frequency resource set, includes: determining, by the processor 802, the first time-frequency resource set as any one of or a combination of: a first control channel carrying the at least one DCI; a monitoring occasion or a search space or a control resource set associated with the first control channel carrying the at least one DCI; a time-frequency resource set configured by the higher layer signaling; or a predefined time-frequency resource set.

In one embodiment, the first control channel includes any one of: at least one control channel that performs transmission earliest in time among control channels detected; at least one control channel that performs transmission latest in time among the control channels detected; at least one control channel that performs transmission earliest in time among control channels detected within one scheduling period; or at least one control channel that performs transmission latest in time among control channels detected within one scheduling period.

In one embodiment, determining, by the processor 802, the first control channel as the at least one control channel that performs transmission earliest in time among the control channels detected or as the at least one control channel that performs transmission earliest in time among the control channels detected within one scheduling period, includes: determining, by the processor 802, the at least one control channel that performs transmission earliest in time as any one of: at least one control channel a first symbol of which performs transmission earliest in time; or at least one control channel a last symbol of which performs transmission earliest in time.

In one embodiment, determining, by the processor 802, the first control channel as the at least one control channel that performs transmission latest in time among the control channels detected or as the at least one control channel that performs transmission latest in time among the control channels detected within one scheduling period, includes: determining, by the processor 802, the at least one control channel that performs transmission latest in time as any one of: at least one control channel a first symbol of which performs transmission latest in time; or at least one control channel a last symbol of which performs transmission latest in time.

In one embodiment, determining, by the processor 802, the first time-frequency resource set as the time-frequency resource set configured by higher layer signaling, includes: determining, by the processor 802, the time-frequency resource set configured by the higher layer signaling as at least one of: at least one symbol configured by the higher layer signaling; a time-frequency resource set that is used by one control channel and is configured by the higher layer signaling; a search space that is associated with one control channel and is configured by the higher layer signaling; a monitoring occasion that is associated with one control channel and is configured by the higher layer signaling; or a control resource set that associated with one control channel and is configured by the higher layer signaling.

In one embodiment, determining, by the processor 802, the first time-frequency resource set as the predefined time-frequency resource set, includes: determining, by the processor 802, the predefined time-frequency resource set as any one of: a first symbol or a last symbol in a time slot in which the DCI is obtained by the terminal; a time slot in which the DCI is obtained by the terminal; or a first symbol or a last symbol in which the DCI is obtained by the terminal.

In one embodiment, determining, by the processor 802, the reference transmission position as the first symbol set in the first time-frequency resource set, includes: determining, by the processor 802, the first symbol set in the first time-frequency resource set as any one of or a combination of: a first symbol of the first time-frequency resource set; a second symbol of the first time-frequency resource set; or a last symbol of the first time-frequency resource set.

In one embodiment, determining, by the processor 802, the reference transmission position as the first control resource set, includes: determining, by the processor 802, the first control resource set as any one of: a control resource set used by the first control channel carrying the at least one DCI; or a predefined control resource set.

In one embodiment, determining, by the processor 802, the first control resource set as the predefined control resource set, includes: determining, by the processor 802, a control resource set that has a smallest index among control resource sets associated with a search space which is to be monitored, as the predefined control resource set.

In one embodiment, the first physical channel includes any one of: a physical downlink shared channel; a physical uplink shared channel; a physical downlink shared channel with repetition transmission; or a physical uplink shared channel with repetition transmission.

In one embodiment, the first physical information includes a channel state information-reference signal (CSI-RS).

In one embodiment, the transmission parameter at least includes any one of or a combination of time domain resource assignment information, frequency domain resource assignment information, redundancy version information, or transmission configuration indication (TCI) information.

Figure 9:
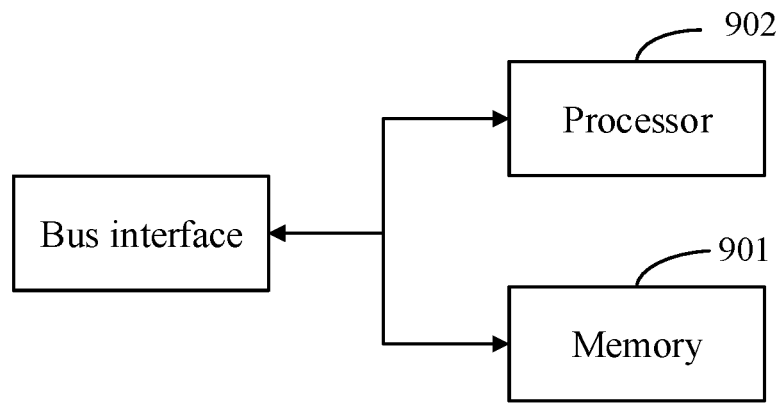
FIG. 9 is a schematic diagram of a logical structure of a terminal according to an embodiment of the present application.

In some embodiments, with reference to FIG. 9, an embodiment of the present application provides an apparatus for determining an information transmission position, which at least includes a processor 902 and a memory 901, and the processor 902 is configured to read a program in the memory 901 and to: generate a DCI; and transmit at least two DCIs to a terminal, determine, when the terminal obtains at least one DCI of the at least two DCIs, a reference transmission position according to a predefined rule, and determine a transmission parameter for a first physical channel or first physical information according to the reference transmission position, and the predefined rule is pre-configured information, or is indicated by higher layer signaling before the at least one DCI is received.

Figure 10:
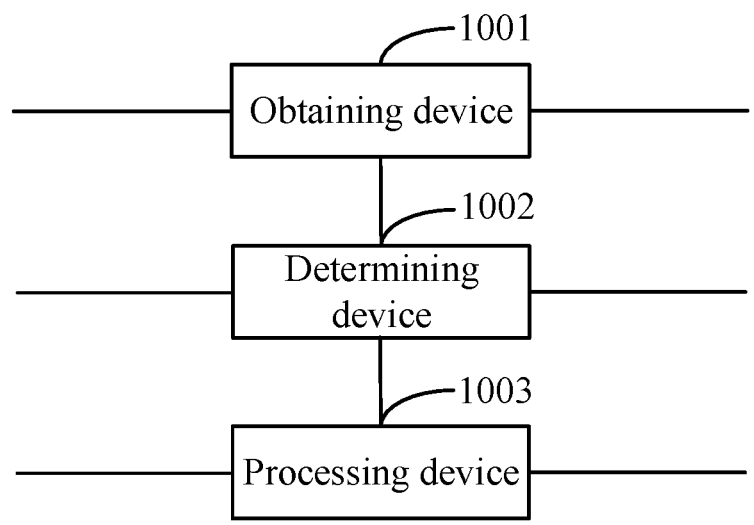
FIG. 10 is a schematic diagram of an entity structure at a network side according to an embodiment of the present application.

In some embodiments, with reference to FIG. 10, an embodiment of the present application provides an apparatus for determining an information transmission position, at least including: an obtaining device 1001, a determining device 1002 and a processing device 1003.

The obtaining device 1001 is configured to obtain at least one downlink control information (DCI) transmitted by a network side, and the at least one DCI is at least one of at least two DCIs transmitted by the network side; the determining device 1002 is configured to determine a reference transmission position according to a predefined rule, and the predefined rule is predefined information, or is indicated by higher layer signaling before the at least one DCI is received; and the processing device 1003 is configured to determine a transmission parameter for a first physical channel or first physical information according to the reference transmission position.

Figure 11:
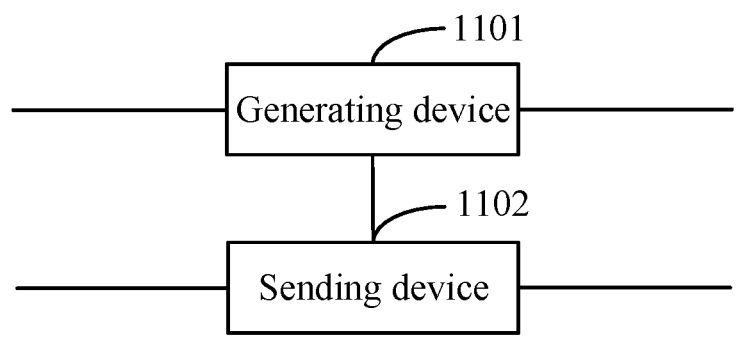
FIG. 11 is a schematic diagram of a logical structure at a network side according to an embodiment of the present application.

In some embodiments, with reference to FIG. 11, an embodiment of the present application provides an apparatus for determining an information transmission position, at least including: a generating device 1101 and a sending device 1102.

The generating device 1101 is configured to generate a DCI; and the sending device 1102 is configured to transmit at least two DCIs to a terminal, determine, when the terminal obtains at least one DCI of the at least two DCIs, a reference transmission position according to a predefined rule, and determine a transmission parameter for a first physical channel or first physical information according to the reference transmission position, and the predefined rule is pre-configured information, or is indicated by higher layer signaling before the at least one DCI is received.

To sum up, according to the method and apparatus for determining the information transmission position provided in the embodiments of the present application, the terminal obtains the least one downlink control information (DCI) transmitted by the network side, the at least one DCI is at least one of the at least two DCIs transmitted by the network side, then, the terminal determines the reference transmission position according to the predefined rule that is predefined information, or is indicated by the higher layer before the at least one DCI is received, and the terminal determines the transmission parameter for the first physical channel or the first physical information according to the reference transmission position.

The transmission parameters for the first physical channel or the first physical information may be determined according to the determined reference transmission position, to avoid the problem that the terminal determines the transmission position of the first physical channel or the first physical information by mistake to result in a failure of reception of the transmitted data information or the first physical information, and guaranteeing the reliability of the reception of the transmitted data information by the terminal.

The embodiments of the present application may be provided as a method, system, or computer program product. Accordingly, the present application may take the form of an entirely hardware embodiment, an entirely software embodiment or an embodiment combining software and hardware aspects. Furthermore, the present application may take the form of a computer program product embodied on one or more computer available storage media (including but not limited to a disc memory, CD-ROM, an optical memory, etc.) having computer available program codes.

The present application is described with reference to flowcharts and/or block diagrams of the method, apparatus (system) and computer program products according to the embodiments of the application. It should be understood that each flow and/or block in the flowcharts and/or block diagrams, and combinations of flows and/or blocks in the flowcharts and/or block diagrams, can be implemented by computer program instructions. These computer program instructions may be provided to a general purpose computer, a special purpose computer, an embedded processor, or a processor of other programmable data processing devices to produce a machine, and the instructions, which are executed via the computer or the processor of other programmable data processing devices, create an apparatus for implementing the functions specified in one or more flows of the flowcharts and/or one or more blocks of the block diagrams.

These computer program instructions may also be stored in a computer-readable memory that can direct the computer or other programmable data processing devices to operate in a particular manner, and the instructions stored in the computer-readable memory may produce an article of manufacture including an instruction apparatus which implements the functions specified in one or more flows of the flowcharts and/or one or more blocks of the block diagrams.

These computer program instructions may also be loaded onto the computer or other programmable data processing devices, and a series of operational steps are performed on the computer or other programmable devices to produce a computer-implemented process, and therefore, the instructions which are executed on the computer or other programmable devices provide steps for implementing the functions specified in one or more flows of the flowcharts and/or one or more blocks of the block diagrams.

Although some embodiments of the present application have been described, additional variations and modifications on these embodiments once knowing the embodiments. Therefore, the appended claims are intended to be construed to include the embodiments and all variations and modifications that fall within the embodiments of the present application.

What is claimed is:

1. A method for determining an information transmission position, comprising:
obtaining, by a terminal, at least one downlink control information (DCI) sent by a network side, wherein the at least one DCI is at least one of at least two DCIs sent by the network side; wherein information contents of the at least two DCIs are identical and respectively carried in physical downlink control channels (PDCCHs) configured for repetition transmission;
determining, by the terminal, a first time-frequency resource set according to predefined information; wherein the first time-frequency resource set is first control channel resources carrying the at least one DCI; wherein the first control channel resources comprises:
at least one control channel resource on which transmission is performed earliest in time among control channel resources detected by the terminal; wherein the method further comprises: determining, by the terminal, the at least one control channel resource on which transmission is performed earliest in time as at least one control channel resource, on a first symbol of which transmission is performed earliest in time; or
at least one control channel resource on which transmission is performed latest in time among the control channel resources detected by the terminal; wherein the method further comprises: determining, by the terminal, the at least one control channel resource on which transmission is performed latest in time as at least one control channel, on a last symbol of which transmission is performed latest in time; and
determining, by the terminal, a transmission parameter for a first physical channel or first physical information according to the first time-frequency resource set.

2. The method according to claim 1, wherein the first physical channel comprises any one of:
a physical downlink shared channel;
a physical uplink shared channel;
a physical downlink shared channel with repetition transmission; or
a physical uplink shared channel with repetition transmission.

3. The method according to claim 1, wherein the first physical information comprises a channel state information-reference signal (CSI-RS).

4. The method according to claim 1, wherein the transmission parameter at least comprises any one of: time domain resource assignment information, frequency domain resource assignment information, redundancy version information, or transmission configuration indication (TCI) information.

5. A method for determining an information transmission position, comprising:
generating, by a network side, a downlink control information (DCI);
sending, by the network side, at least two DCIs to a terminal; wherein information contents of the at least two DCIs are identical and respectively carried in physical downlink control channels (PDCCHs) configured for repetition transmission;
determining, by the network side, in a condition that the terminal obtains at least one DCI of the at least two DCIs, a first time-frequency resource set according to a predefined information; wherein the first time-frequency resource set is first control channel resources carrying the at least one DCI; wherein the first control channel resources comprises:
at least one control channel resource on which transmission is performed earliest in time among control channel resources detected by the terminal, and the at least one control channel resource on which transmission is performed earliest in time is determined by the terminal as at least one control channel resource, on a first symbol of which transmission is performed earliest in time; or at least one control channel resource on which transmission is performed latest in time among the control channel resources detected by the terminal, and the at least one control channel resource on which transmission is performed latest in time is determined by the terminal as at least one control channel, on a last symbol of which transmission is performed latest in time; and determining, by the network side, a transmission parameter for a first physical channel or first physical information according to the first time-frequency resource set.

6. An apparatus for determining an information transmission position, at least comprising a processor and a memory;
wherein the processor is configured to read a program in the memory and to perform the method according to claim 5.

7. The method according to claim 5, wherein the first physical channel comprises any one of:
a physical downlink shared channel;
a physical uplink shared channel;
a physical downlink shared channel with repetition transmission; or
a physical uplink shared channel with repetition transmission.

8. The method according to claim 5, wherein the first physical information comprises a channel state information-reference signal (CSI-RS).

9. The method according to claim 5, wherein the transmission parameter at least comprises any one of: time domain resource assignment information, frequency domain resource assignment information, redundancy version information, or transmission configuration indication (TCI) information.

10. An apparatus for determining an information transmission position, at least comprising a processor and a memory;
wherein the processor is configured to read a program in the memory, and to:
obtain at least one downlink control information (DCI) sent by a network side,
wherein the at least one DCI is at least one of at least two DCIs sent by the network side;
wherein information contents of the at least two DCIs are identical and respectively carried in physical downlink control channels (PDCCHs) configured for repetition transmission;

determine a first time-frequency resource set according to predefined information; wherein the first time-frequency resource set is first control channel resources carrying the at least one DCI; wherein the first control channel resources comprises:

at least one control channel resource on which transmission is performed earliest in time among control channel resources detected by the terminal; wherein the processor is further configured to read a program in the memory to determine the at least one control channel resource on which transmission is performed earliest in time as at least one control channel resource, on a first symbol of which transmission is performed earliest in time; or at least one control channel resource on which transmission is performed latest in time among the control channel resources detected by the terminal; wherein the processor is further configured to read a program in the memory to determine the at least one control channel resource on which transmission is performed latest in time as at least one control channel, on a last symbol of which transmission is performed latest in time; and determine a transmission parameter for a first physical channel or first physical information according to the first time-frequency resource set.

11. The apparatus according to claim 10, wherein the first physical channel comprises any one of:
a physical downlink shared channel;
a physical uplink shared channel;
a physical downlink shared channel with repetition transmission; or
a physical uplink shared channel with repetition transmission.

12. The apparatus according to claim 10, wherein the first physical information comprises a channel state information-reference signal (CSI-RS).

13. The apparatus according to claim 10, wherein the transmission parameter at least comprises any one of: time domain resource assignment information, frequency domain resource assignment information, redundancy version information, or transmission configuration indication (TCI) information.

* * * * *